UNITED STATES PATENT OFFICE.

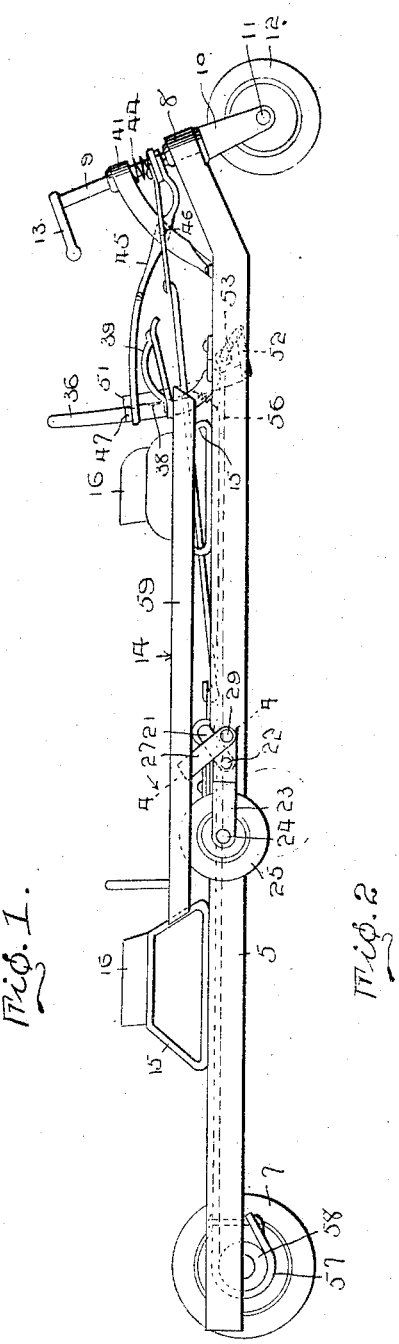

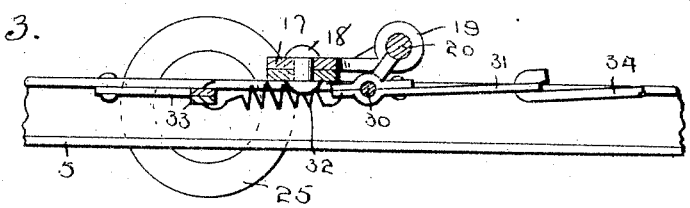
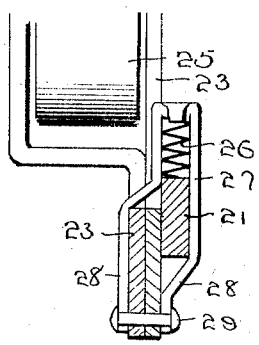
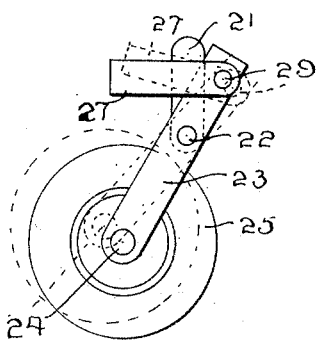
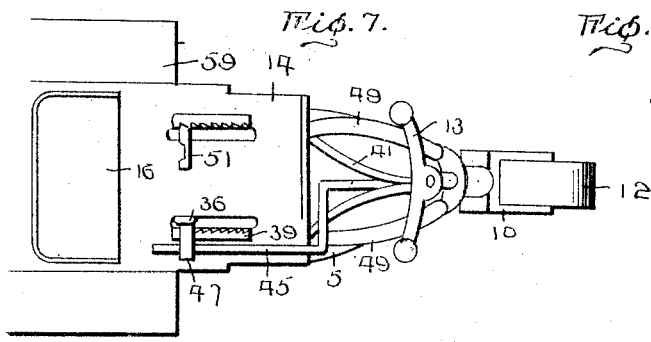
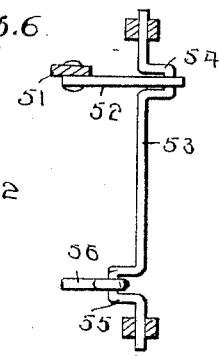

CHARLES E. WRIGHT, OF MEADE COUNTY, KENTUCKY.

MOTOR-VEHICLE.

1,366,235.   Specification of Letters Patent.   Patented Jan. 18, 1921.

Application filed January 15, 1920. Serial No. 351,533.

*To all whom it may concern:*

Be it known that I, CHARLES E. WRIGHT, a citizen of the United States, residing in the county of Meade and State of Kentucky, have invented certain new and useful Improvements in Motor-Vehicles, of which the following is a specification.

This invention relates to improvements in motor vehicles of the two wheel type and has for its principal object to provide a vehicle of this character equipped with auxiliary stabilizing wheels designed to be moved to ground engaging position on opposite sides of the longitudinal axis of the vehicle in case of emergency, as when the vehicle is overbalanced or when striking a curb in the roadway.

A further object is the provision of conveniently accessible and operable means for moving the auxiliary wheels to operative position, such means including a connection between the front steering wheel and the auxiliary wheels whereby the movement of the latter is automatically controlled to cause them to follow in the direction of the steering wheel.

A further object resides in the provision of adequate cushioning and shock absorbing devices whereby independent vertical movement of the auxiliary or supplemental wheels is permitted, such as may be necessary in traveling over an irregular roadway.

With these and other objects in view as will appear as the description proceeds the invention comprises the novel features of construction, combination of elements and arrangement of parts which will be more fully described in the following specification and set forth with particularity in the claims appended hereto.

Figure 1 represents a side elevation of the improved motor vehicle.

Fig. 2 represents a top plan view thereof, the body and seats being removed.

Fig. 3 represents a fragmentary longitudinal sectional view through the vehicle on the line 3—3 of Fig. 2.

Fig. 4 represents a fragmental sectional view, on an enlarged scale, on the line 4—4 of Fig. 1 illustrating the yieldable cushioning device for one of the supplemental wheels in detail.

Fig. 5 represents a fragmental enlarged side elevation of one of the supplemental wheels illustrating the range of movement thereof relative to the adjusting means.

Fig. 6 represents a plan view of the shaft actuating the brake for the rear wheel, and, Fig. 7 represents a fragmentary plan view of the front portion of the vehicle illustrating the position and arrangement of the hand control levers.

Referring to the drawing in detail, wherein similar reference numerals designate corresponding parts throughout the several views, the numeral 5 indicates the elongated side bars of the frame structure of the vehicle which are connected at intervals by the transverse connecting members 6 and are supported at their rear terminals upon a road engaging wheel 7. The front terminals of the side bars are converged and inclined upwardly as at 8 and are provided with a suitable bearing member receiving the inclined steering post 9. The lower extremity of the post 9 below the terminals of the side bars 5 is connected with a fork 10 supporting the front axle 11 from which the front steering wheel 12 is rotatably mounted. The upper extremity of the steering post is connected with a handle bar 13 which is extended into convenient reach of the driver of the vehicle for manipulation in directing its course.

A preferred type of body 14 is supported above the frame structure upon springs 15 and is preferably equipped with seats 16 to be occupied by the passengers of the vehicle.

The centrally disposed connecting member 6 of the main frame structure is preferably of such size as to provide an adequate support for the lever 17 which is pivotally secured thereto at 18 and is provided with forwardly directed angular terminals which overlie the side bars 5 and are suitably formed to provide bearing members 19 for a rock shaft 20 journaled therein.

The terminals of the rock shaft 20 are directed angularly in parallel relation to each other and are normally disposed in rearwardly inclined position, being pivotally secured at 22 to the shank portions of the bearing forks 23. The opposite terminals of the forks support axles 24 on which the supplementary balancing wheels 25 are journaled, the latter normally occupying an elevated position laterally of the side rails 5 as shown in full lines in Fig. 1.

The forks 23 normally occupy angular positions with relation to the crank arms 21 of the rock shaft 20 and are capable of swinging movement relative thereto due to their connection 22 with the arms. The relative movement of the forks to the crank arms 21 is yieldably restrained by expansion springs 26 which are confined in substantially U-shaped holders 27 having offset terminals 28 pivoted as at 29 to the shanks of the forks. The springs 26 are engaged at their opposite terminals with the web portions of the holders 27 and the crank arms 21 thus maintaining the forks 23 in predetermined angular relation to the arms 21. However, upon application of sufficient upward pressure to the terminals of the forks 23 the latter are swung upon their axes 22 against the tension of the springs 26 but when such pressure is relieved the forks are automatically restored to initial position by the tension of said springs.

A crank arm of loop 30 is rigidly connected with the rock shaft 20 centrally of the latter and is pivotally connected with a forwardly extending rod 31, the rear extremity of which is connected by a spring 32 with a pair of forwardly converging links 33 connected with the opposed side bars 5. The loop or crank 30 is normally disposed in a rearwardly inclined position, similarly to the crank arms 21 and is maintained in such position by the tension of the spring 32, thus disposing the supplemental wheels 25 in elevated inoperative position.

The forward extremity of the rod 31 is connected by a link 34 with a laterally projecting arm 35 of a manually operable lever 36 which is pivotally mounted upon a hinge rod 37 adequately supported in the front portion of the frame structure of the vehicle. The arm 35 is arranged above the pivotal axis of the lever 36 so that a forward movement of the hand lever is necessary to produce such rocking movement of the shaft 20 as will shift the wheels 25 to operative position. A preferred type of locking device 38 is provided on the lever 36 and is adapted to coöperate with a ratchet 39 whereby the lever is locked in adjusted position to maintain the supplemental wheels 25 in ground engaging position.

The portion of the steering post 9 intermediate the head 8 of the frame structure and the handle bar 13 is mounted in a brace 41 extending forwardly and upwardly from the side bars 5 and said post is preferably cylindrical in form throughout its entire length except for a small portion disposed directly above the bearing member 8 which portion is of polygonal form and which is engageable in the angular recess 42 of a lever 43 loosely mounted upon the post 9. A coil spring 44 is confined between the brace 41 and the lever 43 and normally tends to move the latter downwardly upon the polygonal portion of the post 9 whereby to prevent turning movement of the post 9 independently of the lever 43. However, when the lever is elevated to such position as to engage the cylindrical portion of the post 9 the latter, as will be understood, is capable of turning independently of the lever.

A lever 45 is pivotally mounted at 46 in the brace 41 and is provided with a bifurcated extremity receiving the post 9 and engaging beneath and supporting the lever 43. The rear extremity of the lever 45 is extended horizontally and confined beneath a laterally projecting arm 47 of the hand lever 36. The arrangement of the lever 45 is such that when the hand lever 36 is moved rearwardly to elevate the supplemental wheels 25 to inoperative position, the front bifurcated extremity of the lever 45 is elevated thereby raising the lever 43 and permitting turning movement of the post 9 independently of the lever 43. The outer extremities of the lever 43 are connected by angular links 49 and rods 52ª and links 50 with the lever 17 on opposite sides of the pivotal axis 18 of the latter.

A foot pedal 51 is arranged alongside of the hand lever 36 and is also pivotally mounted upon the hinge rod 37. The lower extremity of the pedal is connected by a link 52 with one of the cranks 54 of a crank shaft 53. This crank 54 normally occupies a forwardly and downwardly inclined position and is provided with a second crank 55 formed on the shaft 53, the last mentioned crank being connected by a rod 56 with a brake band 57 mounted on a drum 58 rigidly connected with the rear supporting wheel 7.

Fenders 59 for the supplemental balancing wheels 25 are arranged laterally of the vehicle body 14 and are rigidly connected therewith to assist in supporting the load disposed thereon.

In use, the vehicle may be propelled by a suitable motor (not shown) and is ordinarily operated in the manner of a motor cycle or similar type of two wheeled vehicle, the lever 43 being maintained in elevated position due to the depression of the rear extremity of the lever 45 by the arm 47 of the hand lever 36, thereby permitting independent rotary movement of the post 9 as when steering the vehicle. When taking a curve in the roadway, or traveling over a rough roadway or in any other emergency, the lever 36 is moved forwardly thus exerting a longitudinal forward pull to the rod 31 and, through the shank 30 rocking the shaft 20 so as to swing the forks 23 downwardly and engage the wheels 25 with the ground on opposite sides of the vehicle frame. In this manner, the vehicle is properly balanced and prevented from swinging to either side and the supplemental wheels are maintained in adjusted position by coöperation of the locking device 38 with the ratchet 39. As the hand lever 36 is moved forwardly in the act of moving the supplementary wheel to operative position, the rear extremity of the lever 45 is permitted to elevate, due to the shifting of the position of the arm 47 and the lever 43 is forced downwardly by the tension of the spring 44 so as to engage the polygonal recess 42 of said lever with the polygonal portion of the post 9 thus establishing a non-rotatable connection between the lever 43 and the post and causing the lever to move in synchronism with the steering movement of the front wheel 12. The movement of the lever 43 is transmitted to the lever 17 through the rods and links 49 and 50 and thus the lever 17 and rock shaft 20 are caused to assume an angular position with the longitudinal axis of the vehicle when the steering wheel 12 is turned to either side thus causing the supplemental wheels 25 to follow in the path of said steering wheel. However, when the lever 36 is restored to its initial position to move the supplemental wheels 25 to inoperative position, the rear terminal of the lever 45 is depressed by the arm 47 of the hand lever 36 and the lever 43 is elevated to inoperative position thereby disconnecting said lever 43 from operative engagement with the post 9 and permitting the latter to turn independently of the lever 43 and without transmitting movement thereof to the supplemental wheels 25. The springs 26 tend to maintain the supporting forks 23 for the supplemental wheels in predetermined angular relation to the crank arms 21 but, due to the resiliency of said springs and the pivotal connection 22 between the forks and the arms, said forks are permitted to oscillate slightly to compensate for irregularities in the roadway.

What I claim is:

1. In a motor vehicle, a frame, front and rear supporting wheels therefor, supplemental supporting wheels arranged on opposite sides of the frame and mounted for steering movement, and yieldable means for moving said wheels to ground engaging position.

2. In a motor vehicle, a frame, front and rear supporting wheels therefor, supplemental supporting wheels arranged on opposite sides of the frame and mounted for steering movement, yieldable means for moving said wheels to ground engaging position, and means for releasably locking the first mentioned means in adjusted position to maintain said wheels in ground engaging position.

3. In a motor vehicle, a frame, front and rear supporting wheels therefor, supplemental supporting means arranged on opposite sides of the frame and movable to ground engaging position, and means for imparting steering movement to said supplemental wheels.

4. In a motor vehicle, a frame, front and rear supporting wheels therefor, the front wheel being capable of steering movement, supplemental supporting wheels arranged on opposite sides of the frame, and means connecting the front wheel with the supplemental wheels for effecting steering movement of the latter.

5. In a motor vehicle, a frame, front and rear supporting wheels therefor, the front wheel being capable of steering movement, supplemental supporting wheels arranged on opposite sides of the frame and movable to ground engaging position, and means operable when said supplemental wheels are moved to operative ground engaging position to establish connection between the front steering wheel and the supplemental wheels for effecting steering movement of the latter.

6. In a motor vehicle, a frame, front and rear supporting wheels therefor, the front wheel being capable of steering movement, supplemental supporting wheels arranged on opposite sides of the frame, manually operable means for moving the supplemental wheels to ground engaging position, and means connecting the steering front wheel with the supplemental wheels for effecting steering movement of the latter.

7. In a motor vehicle, a frame, front and rear supporting wheels therefor, the front wheel being capable of steering movement, supplemental supporting wheels arranged on opposite sides of the frame, manually operable means for moving the supplemental wheels to ground engaging position, means connecting the front steering wheel with the supplemental wheels for effecting steering movement of the latter simultaneously with the steering movement of the front wheel, and means controlled by the manually operable means for rendering the connecting means inoperative when the supplemental wheels are elevated to inoperative position.

8. In a motor vehicle, a frame, front and rear supporting wheels therefor, supplemental supporting wheels arranged on opposite sides of the frame, a rock shaft pivotally supported upon the frame and having angular extremities, forks rotatably supporting the supplemental wheels, means pivotally connecting said forks with the angular extremities of the rock shaft, holders carried by the forks and embracing the angular extremities of the rock shaft, and yieldable means confined by said holders for engaging said rock shaft whereby the supplemental supporting wheels are maintained in predetermined position relative to the rock shaft.

9. In a motor vehicle, a frame, front and rear supporting wheels therefor, supplemental supporting wheels arranged on opposite sides of the frame, a horizontally disposed lever pivotally supported on the frame provided with bearing members, a rock shaft journaled in said bearing members and capable of swinging movement with the lever, means connecting the rock shaft with the steering wheels, means for moving the supplemental wheels to ground engaging position, and means for oscillating the lever to produce steering movement of the supplemental wheels.

10. In a motor vehicle, a frame, front and rear supporting wheels therefor, the front wheel being capable of steering movement, supplemental supporting wheels arranged on opposite sides of the frame, a pivoted lever mounted upon the frame and supporting the supplemental wheels, a lever actuated by the steering movement of the front supporting wheel, and means connecting the last mentioned lever with the first mentioned lever for producing steering movement of the supplemental wheels simultaneously with the steering movement of the front wheel.

11. In a motor vehicle, a frame, front and rear supporting wheels therefor, the front supporting wheel being capable of steering movement, supplemental supporting wheels arranged on opposite sides of the frame, a pivoted lever carried by the frame and supporting the supplemental wheels, means for moving the supplemental wheels to ground engaging position, a lever movable into coöperative relation with the front steering wheel whereby steering movement of the latter is transmitted to the lever, means connecting the first and second mentioned levers whereby steering movement is transmitted to the supplemental wheels, and means actuated by the first mentioned means to move the second mentioned lever to inoperative position with relation to the front steering wheel when the supplemental wheels are elevated to inoperative position.

In testimony whereof, I affix my signature hereto.

CHARLES E. WRIGHT.